United States Patent
Choe et al.

(10) Patent No.: US 9,708,456 B2
(45) Date of Patent: Jul. 18, 2017

(54) INJECTION MOLDING SYSTEMS AND METHODS FOR FORMING MATERIALS USED IN FOOTWEAR AND MATERIALS MANUFACTURED BY SAID SYSTEMS AND METHODS

(75) Inventors: Patrick Y. Choe, Medford, MA (US); Sean B. Murphy, North Andover, MA (US); Levi A. Kishbaugh, Groveland, MA (US)

(73) Assignee: New Balance Athletics, Inc., Boston, MA (US)

( * ) Notice: Subject to any disclaimer, the term of this patent is extended or adjusted under 35 U.S.C. 154(b) by 602 days.

(21) Appl. No.: 13/360,229

(22) Filed: Jan. 27, 2012

(65) Prior Publication Data
US 2012/0196115 A1 Aug. 2, 2012

Related U.S. Application Data

(60) Provisional application No. 61/436,734, filed on Jan. 27, 2011.

(51) Int. Cl.
*B29C 44/58* (2006.01)
*B29D 35/14* (2010.01)
(Continued)

(52) U.S. Cl.
CPC .............. *C08J 9/34* (2013.01); *B29C 44/10* (2013.01); *B29C 44/586* (2013.01);
(Continued)

(58) Field of Classification Search
CPC . B29C 44/083; B29C 44/353; B29C 45/5605; B29C 44/586; B29C 45/376;
(Continued)

(56) References Cited

U.S. PATENT DOCUMENTS 3,705,463 A * 12/1972 Lown ........................... 36/25 R
4,473,665 A 9/1984 Martini-Vvedensky et al.
(Continued)

FOREIGN PATENT DOCUMENTS

EP 0995569 A2 4/2000
EP 1166991 A2 1/2002
(Continued)

OTHER PUBLICATIONS

International Preliminary Report on Patentability for PCT/US2012/022928, mailed Aug. 8, 2013.
(Continued)

*Primary Examiner* — Jeffrey Wollschlager
*Assistant Examiner* — Armand Melendez
(74) *Attorney, Agent, or Firm* — Goodwin Procter LLP

(57) ABSTRACT

The invention relates to systems and methods for creating a foamed part. An example method includes providing a polymer processing system, providing a mold having at least one expandable mold cavity in fluid communication with the polymer processing system, mixing polymeric material and blowing agent within the polymer processing system to produce a unfoamed mixture, injecting a volume of the mixture of polymeric material and blowing agent from the polymer processing system and into the expandable mold cavity, and expanding the mold cavity to expand the unfoamed mixture within the mold cavity and form the foamed part.

25 Claims, 10 Drawing Sheets

(51) Int. Cl.
*B29D 35/00* (2010.01)
*C08J 9/34* (2006.01)
*B29C 44/10* (2006.01)
*C08L 75/04* (2006.01)
*B29K 105/04* (2006.01)

(52) U.S. Cl.
CPC ......... *B29D 35/142* (2013.01); *B29D 35/148* (2013.01); *C08L 75/04* (2013.01); *B29K 2105/041* (2013.01); *C08J 2201/03* (2013.01); *C08J 2375/04* (2013.01); *Y10T 428/249953* (2015.04)

(58) Field of Classification Search
CPC ....... B29C 33/26; B29C 33/28; B29C 37/005; B29C 44/585
See application file for complete search history.

(56) References Cited

U.S. PATENT DOCUMENTS

| | | | | |
|---|---|---|---|---|
| 4,783,292 A * | 11/1988 | Rogers | ................. | B29C 44/421 264/328.7 |
| 5,415,540 A * | 5/1995 | Proksa | ................. | B29C 33/306 425/183 |
| 5,670,102 A | 9/1997 | Perman et al. | | |
| 5,997,781 A | 12/1999 | Nishikawa et al. | | |
| 6,146,562 A * | 11/2000 | Hettinga | ................. | 264/45.5 |
| 6,231,942 B1 | 5/2001 | Blizard et al. | | |
| 6,322,347 B1 | 11/2001 | Xu | | |
| 6,437,013 B2 | 8/2002 | Kuwamura et al. | | |
| 6,579,910 B2 | 6/2003 | Xu | | |
| 6,613,811 B1 | 9/2003 | Pallaver et al. | | |
| 6,616,434 B1 | 9/2003 | Burnham et al. | | |
| 6,659,757 B2 | 12/2003 | Kim et al. | | |
| 6,773,640 B2 * | 8/2004 | Sugihara et al. | ............... | 264/50 |
| 6,849,667 B2 | 2/2005 | Haseyama et al. | | |
| 6,884,823 B1 | 4/2005 | Pierick et al. | | |
| 6,926,507 B2 | 8/2005 | Cardona et al. | | |
| 7,107,601 B2 * | 9/2006 | Arai | ............................ | 720/651 |
| 7,144,532 B2 | 12/2006 | Kim | | |
| 7,144,534 B2 * | 12/2006 | Buchel et al. | ................. | 264/109 |
| 7,150,615 B2 | 12/2006 | Sugihara et al. | | |
| 7,172,333 B2 | 2/2007 | Anderson et al. | | |
| 7,267,534 B2 | 9/2007 | Xu | | |
| 7,318,713 B2 | 1/2008 | Xu et al. | | |
| 7,615,170 B2 | 11/2009 | Xu et al. | | |
| 2002/0045040 A1 | 4/2002 | Kanada et al. | | |
| 2005/0230861 A1 | 10/2005 | Takatori et al. | | |
| 2007/0031532 A1* | 2/2007 | Chen | ..................... | B29C 33/306 425/555 |
| 2007/0123598 A1 | 5/2007 | Nam et al. | | |
| 2008/0290543 A1* | 11/2008 | Okamoto | .............. | B29C 44/586 264/55 |
| 2010/0086636 A1 | 4/2010 | Xu et al. | | |
| 2010/0155981 A1* | 6/2010 | Miyabe | ................. | B29C 44/086 264/45.2 |

FOREIGN PATENT DOCUMENTS

| | | |
|---|---|---|
| EP | 0799853 B1 | 9/2003 |
| EP | 1806217 A1 | 7/2007 |
| EP | 1878555 A2 | 1/2008 |
| JP | 9225978 | 2/1997 |

OTHER PUBLICATIONS

European Examination Report in EP 12 704 182.0 dated Dec. 23, 2015, 8 pages.

* cited by examiner

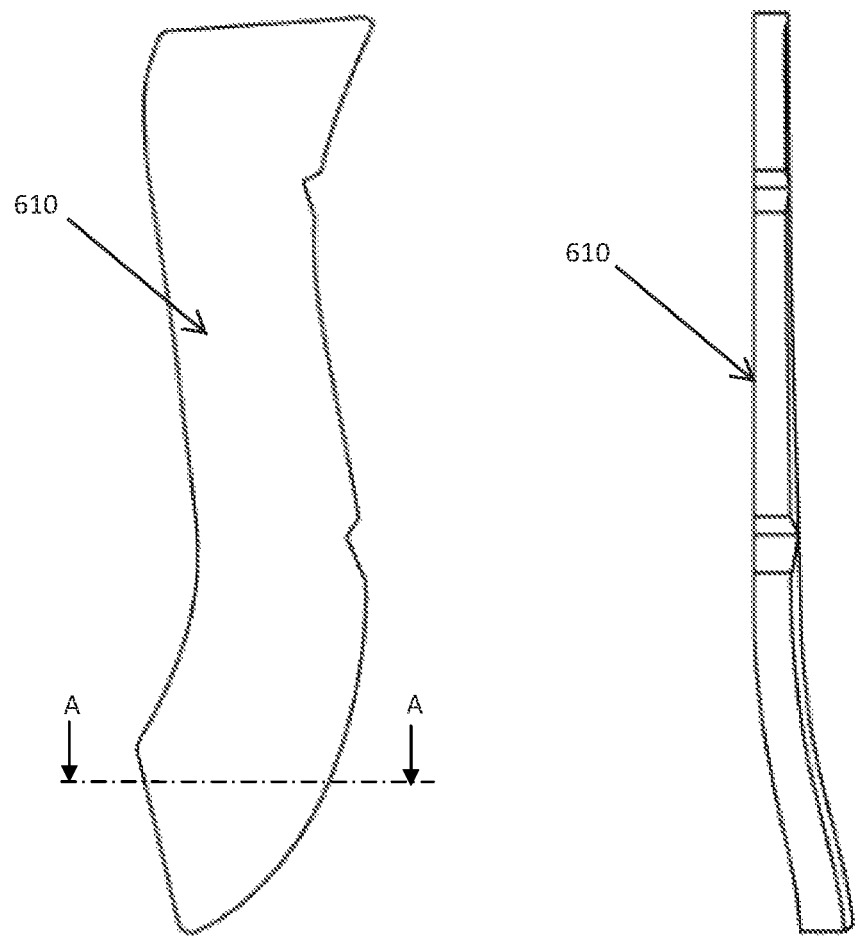
FIG. 8A
FIG. 8B
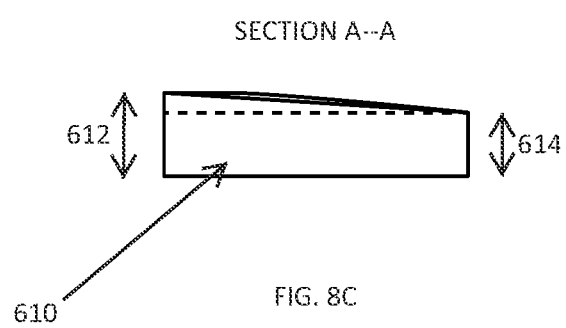
FIG. 8C

INJECTION MOLDING SYSTEMS AND METHODS FOR FORMING MATERIALS USED IN FOOTWEAR AND MATERIALS MANUFACTURED BY SAID SYSTEMS AND METHODS

CROSS-REFERENCE TO RELATED APPLICATIONS

This application claims priority to and the benefit of U.S. provisional patent application Ser. No. 61/436,734, filed Jan. 27, 2011, the disclosure of which is being incorporated herein by reference in its entirety. This application is related to the following U.S. patents and applications, which are incorporated herein by reference in their entirety: U.S. Pat. No. 6,322,347, issued on Nov. 27, 2001; U.S. Pat. No. 6,616,434, issued on Sep. 9, 2003; U.S. Pat. No. 6,659,757, issued on Dec. 9, 2003; U.S. Pat. No. 6,884,823, issued on Apr. 26, 2005; U.S. Pat. No. 6,926,507, issued on Aug. 9, 2005; U.S. Pat. No. 7,144,532, issued on Dec. 5, 2006; U.S. Pat. No. 7,172,333, issued on Feb. 6, 2007; U.S. Pat. No. 7,267,534, issued on Sep. 11, 2007; U.S. Pat. No. 7,318,713, issued on Jan. 15, 2008; U.S. Pat. No. 7,615,170, issued on Nov. 10, 2009; and U.S. Patent Publication No. 2010/0086636, published on Apr. 8, 2010.

FIELD OF THE INVENTION

The present invention relates generally to the field of injection molding, and more particularly to methods and systems for producing foamed parts, and the parts formed thereby.

BACKGROUND OF THE INVENTION

Structural polymeric foamed materials include a plurality of voids, also called cells, in a polymer matrix. A number of techniques for processing polymeric material to produce foamed parts are known in the art. Example techniques may utilize an extruder which plasticates polymeric material by the rotation of a screw within a barrel. In certain processes, a physical blowing agent may be injected into molten polymeric material, for example, through a blowing agent port formed within the barrel of the extruder, to form a mixture of polymeric material and blowing agent. The mixture may then be processed (e.g., extruded, blow molded, or injection molded) to form the desired polymeric foam article.

While such methods may be used to produce a variety of foamed parts, a need exists for improved processes associated with the injection molding of polymeric materials in the production of various foamed parts for use, for example, in the footwear industry.

SUMMARY OF THE INVENTION

The present invention is directed towards foamed parts and novel methods and devices for producing a foamed part.

One aspect of the invention includes a method of forming a foamed part. The method includes providing a polymer processing system including a screw mounted within a barrel to define a polymer processing space within the barrel, a polymeric material delivery system in communication with the polymer processing space, a blowing agent delivery system in communication with the polymer processing space, and at least one nozzle in fluid communication with a distal portion of the polymer processing space. The method further includes providing a mold having at least one expandable mold cavity in fluid communication with the nozzle, mixing polymeric material and blowing agent within the polymer processing space to produce an unfoamed mixture, injecting a volume of the mixture of polymeric material and blowing agent through the nozzle and into the expandable mold cavity, and expanding the mold cavity to form the foamed part. In various embodiments, the method may produce a foamed part having an estimated melt temperature within 5° C. of the melt temperature of the unprocessed polymeric material, having a skin layer with an estimated skin thickness of between about 100 and 500 µm, having an average cell diameter of between about 0.01 µm and 50 µm, and/or having an average cell number of between about $10^8$ and $10^{16}$ cells/cm$^3$.

The polymeric material may include a material selected from the group consisting of polymers, elastomers, and thermoplastics. The polymeric material may include at least one of thermoplastic polyurethane (TPU), ethylene vinyl acetate (EVA), DuPont™ Surlyn®, polyethylene, or thermoplastic rubbers (TPRs). The TPU may include, or consist essentially of, at least one of Pellethane® or Utechllan® and, for example, at least one of Pellethane® 2102-75A, Pellethane® 2355-75A, or Utechllan® UT85-APU. In one embodiment the polymeric material includes, or consists essentially of, a TPU having a Shore A hardness of between about 50-90 or 65-90 or 65-85, or have a Shore D hardness of between about 30-90. The TPR may include, or consist essentially of, at least one of styrene-butadiene-styrene (SBS) or styrene-ethylene-butadiene-styrene (SEBS). The blowing agent may include, or consist essentially of, nitrogen.

In one embodiment, the blowing agent delivery system includes a metering system. The metering system may be adapted to control at least one of a flow rate of the blowing agent and/or a mass of blowing agent to be injected. The mass of blowing agent being injected into the polymeric processing space may be between about 0.1 and 2% by weight of unfoamed mixture and, for example, be between about 0.4 and 0.75% by weight of unfoamed mixture.

The barrel may be heated to an elevated barrel temperature prior to mixing. In one embodiment, the polymeric material may be TPU and the elevated barrel temperature may be between about 380° F. and 420° F. and, for example, about 400° F. In one embodiment, the barrel is divided into a plurality of zones, with a separate temperature setting for each zone. The nozzle may also be heated to an elevated nozzle temperature prior to mixing. The elevated nozzle temperature may be higher than the barrel temperature. In one embodiment, the polymeric material is TPU and the elevated nozzle temperature is about 420° F.

One embodiment of the method includes controlling at least one of a volume of mixture being injected into the mold cavity and/or a rate at which mixture is injected into the mold cavity. The volume of mixture injected into the mold cavity may be between about 95% to 105% of the volume of the mold cavity prior to expansion.

The method may further include maintaining the expandable mold cavity at a first mold temperature prior to injection of polymeric material. The first mold temperature may, for example, be between about 70° F. and 130° F. The mold may include a temperature control system for heating the mold and/or holding the mold at the first mold temperature in one embodiment, the first mold temperature is lower than the temperature of the mixture prior to injection.

The volume of the mold cavity after expansion may be between about 2-12 times the volume of the mold cavity prior to expansion and, for example, be about 3 times the volume of the mold cavity prior to expansion. In various alternative embodiments, for example depending upon the material being processed and/or the desired properties of the foamed part being formed, the volume of the mold cavity after expansion may be between about 2-7 times, about 3-10 times, about 5-12 times, or about 2-8 times the volume of the mold cavity prior to expansion. In one embodiment, the mold expands from a thickness of about 2 mm to a thickness of about 6 mm. In general, the mold may be expanded by any appropriate ratio between its unexpanded and expanded positions.

The mold cavity may be held in an unexpanded position for a first time period prior to expansion. The first time period may be between about 1-30 seconds. In one embodiment, where the polymeric material is TPU, the first time period may be between about 5 to 15 seconds or between about 1-20 seconds and may, for example, be about 10 seconds. The method may also include holding the mold cavity in an expanded position for a second time period after expansion. The second time period may be between about 1-60 seconds, or up to 120 seconds or more, and in one embodiment where the polymeric material is TPU the second time period may be between about 30-40 seconds.

In one embodiment, the method may further include controlling an expansion rate of the expandable mold cavity. The expansion rate of the mold cavity may be faster than the expansion rate of the material injected into the mold. Alternatively, the expansion rate of the mold cavity may be slower than, or substantially similar to, the expansion rate of the material injected into the mold. In one embodiment, expansion of the mold cavity from an unexpanded position to an expanded position may take less than about 5 seconds and, for example, about 1 second.

Expanding the mold cavity may include, or consist essentially of, lateral displacement of a second mold section from a first mold section and/or lateral displacement of a first wall of the mold cavity via a core-back technique. In one embodiment, the lateral wall displacement includes an asymmetric displacement of the first wall with respect to a second wall of the mold cavity. The mold may include a single expandable mold cavity or a plurality of expandable mold cavities.

The foamed part formed from the methods described herein may include a skin layer. The skin layer may have a skin thickness of between about 100 µm and 500 µm. In one embodiment where the polymeric material is TPU the skin layer may have a skin thickness of about 300 µm. The foamed part may have an average cell diameter of between about 0.01 µm and 200 µm and, where the polymeric material is TPU, have an average cell diameter of between about 0.01 µm and 50 µm. The foamed part may have an average cell number of between about $10^8$ and $10^{16}$ cells/cm$^3$.

The foamed part may, for example, form at least one of a midsole for an article of footwear or a component thereof.

Another aspect of the invention includes a system for forming a foamed part. The system includes a screw mounted within a barrel to define a polymer processing space within the barrel, a polymeric material delivery system in communication with the polymer processing space, a blowing agent delivery system in communication with the polymer processing space, and at least one nozzle in fluid communication with a distal portion of the polymer processing space, wherein the polymer processing space is adapted to mix polymeric material and blowing agent to produce an unfoamed mixture. The system further includes a mold having at least one expandable mold cavity in fluid communication with the nozzle, means for injecting a volume of unfoamed mixture through the nozzle and into the expandable mold cavity, and means for expanding the expandable mold cavity to form the foamed part.

Yet another aspect of the invention includes an injection molded part comprising a foamed polymeric material. The part includes a skin layer, wherein the skin layer has a skin thickness of between about 100 µm and 500 µm, an average cell diameter of between about 0.01 µm and 50 µm, and an average cell number of between about $10^8$ and $10^{16}$ cells/cm$^3$, wherein the volume of the foamed part is about 2 to 4 times the volume of the polymeric material prior to foaming. In one embodiment, the skin layer has a skin thickness of about 300 µm. In one embodiment, the volume of the foamed part is about 3 times the volume of the polymeric material prior to foaming. In one embodiment, the foamed part has an estimated melt temperature within 5° C. of the melt temperature of the polymeric material prior to foaming.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 8A is a schematic plan view of a heel component for an article of footwear, in accordance with one embodiment of the invention;

FIG. 8B is a side view of the heel component of FIG. 8A;

FIG. 8C is a side view of the heel component of FIG. 8A through section A-A;

DETAILED DESCRIPTION

The invention described herein relates to systems and methods for producing improved injection molded polymeric foamed articles for use, for example, in footwear, and the resulting foamed parts formed thereby. The systems and methods described herein may be used to produce parts such as, but not limited to, midsoles, or components therefor, for footwear. In one example embodiment, the systems and methods described herein can be used to produce polymeric foamed elements that can be inserted into cavities within a midsole of a shoe sole to provide improved performance for the shoe sole.

Figure 1:
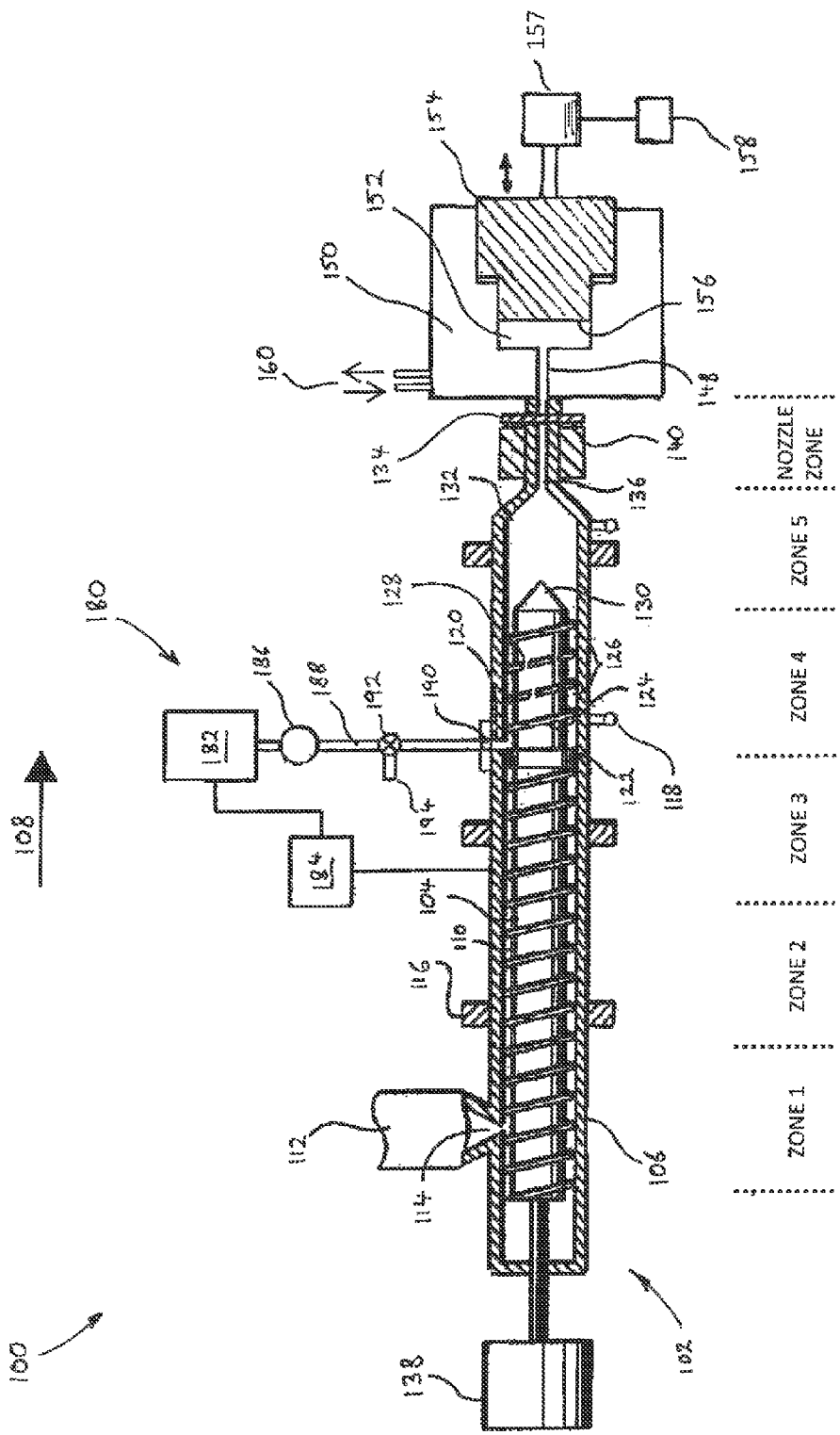
FIG. 1 is a schematic side view of an injection molding system for injecting material into a single expandable mold cavity, in accordance with one embodiment of the invention.

An example injection molding system 100 for producing microcellular material (e.g., a foamed part), in accordance with one embodiment of the invention, is shown in FIG. 1. In this embodiment, the injection molding system 100 is used to injection mold polymeric material articles. The injection molding system 100 includes an extruding system 102 including a polymer processing screw 104 that is rotatable within a barrel 106 to convey polymeric material in a downstream direction 108 within a polymer processing space 110 defined between the screw 104 and the barrel 106. Polymeric material, for example in pelletized form, is fed into polymer processing space 110 from a polymeric material delivery system 112 such as, but not limited to, a hopper, having a delivery portal 114 in fluid communication with the polymer processing space 110. In one embodiment, the barrel 106 may be heated by one or more heating units 116 mounted on an exterior surface of the barrel 106. Alternatively, the heating units 116 may be mounted within the barrel 106 and/or extend at least partially through the barrel.

The heating unit(s) 116 may be used to heat the barrel 106 to an elevated barrel temperature prior to mixing, and hold the barrel 106 at that elevated temperature during mixing and injection. In one embodiment the heating unit(s) 116 can hold the barrel 106 at an elevated barrel temperature of between about 380° F. and 420° F. In one example embodiment, such as for the formation of a foamed part using TPU as the polymeric material, the elevated barrel temperature may be about 400° F. In alternative embodiments, higher or lower barrel temperatures may be utilized.

In one embodiment, the polymer processing space 110 may include a plurality of heating zones extending from the delivery portal 114 for the polymeric material delivery system 112 to the distal portion 132 of the polymer processing space 110 proximate the outlet nozzle 136. As a result, the temperature of the polymeric material and/or blowing agent within the polymer processing space 110 may be precisely controlled throughout the mixing and injection process. In one embodiment, the injection molding system 100 has five heating zones extending between the delivery portal 114 and the distal portion 132 of the polymer processing space 110, with a sixth heating zone in the outlet nozzle 136. In alternative embodiments, a greater or lesser number of heating zones, e.g., 1 heating zone, 2 heating zones, 3 heating zones, or 4 heating zones, not including the outlet nozzle 136 heating zone, may be used.

The barrel 106 may have one or more monitoring elements 118 (e.g., pressure transducers, temperature sensors, chemical sensors, and/or flow rate monitors) coupled thereto to monitor the conditions within the polymer processing space 110.

The polymeric material may include, or consist essentially of, polymers, elastomers, and/or thermoplastics. For example, the polymeric material may be thermoplastic polyurethane (TPU), ethylene vinyl acetate (EVA), DuPont™ Surlyn®, or thermoplastic rubbers (TPRs).

The TPU may, for example, include, or consist essentially of, Pellethane® or Utechllan® and, for example, at least one of Pellethane®2102-75A, Pellethane® 2355-75A, Utechllan® UT75, Utechllan® U80A, and/or Utechllan® U85A. The TPR may, for example, be styrene-butadiene-styrene (SBS) or styrene-ethylene-butadiene-styrene (SEBS). The material (e.g., TPU) may be selected to have a Shore A hardness value of between about 60-90 or 65-90 or 65-85, or have a Shore D hardness of between about 30-90. In alternative embodiments, materials having larger or smaller Shore A hardness values may be utilized, depending upon the specific desired structural characteristics of the resulting foamed part.

A blowing agent delivery system 180 is used to introduce a blowing agent into the polymeric material within the polymer processing space 110 in extruder 102, with the barrel 106 including a port 120 through which the blowing agent is introduced. An example blowing agent delivery system is described in U.S. Patent Publication No. 2010/0086636, the disclosure of which is incorporated herein by reference in its entirety.

The blowing agent delivery system 180 may include elements such as, but not limited to a source 182 of blowing agent (e.g., a storage unit), one or more pumps, a control system 184 for controlling the injection of blowing agent, a metering device 186 for monitoring and controlling the flow rate and/or volume of blowing agent supplied by the source 182, and at least one conduit 188 for transporting the blowing agent from the source 182 to an injector valve 190 coupled to the port 120.

In one embodiment, the blowing agent delivery system 180 includes a bypass valve 192 positioned between the source 182 and port 120. When the bypass valve 192 is in a closed configuration, the flow of blowing agent from the source 182 to the port 120 is diverted through the bypass valve 192 and, in some cases, through a bypass passageway 194. The blowing agent may, for example, be diverted through the bypass passageway 194 and either released to the atmosphere, reintroduced to source 182, or recirculated back into the system 180 prior to the pump. When the bypass valve 192 is in an open configuration blowing agent may flow from the source 182 to the port 120. The bypass valve 192 may be useful, for example, when it is desired to have a constant blowing agent flow from the source 192 and a discontinuous flow of blowing agent into the polymeric material (e.g., during discontinuous plasticating processes such as injection molding). In certain embodiments the system 100 may not include a bypass valve and/or bypass passageway.

In one embodiment, the blowing agent delivery system 180 includes one or more injector valves 190 positioned between source 182 and port 120. When the injector valve 190 is in an open configuration, the flow of blowing agent from the source 182 to the polymeric material in the extruder 102 is stopped. When the injector valve 190 is in an open configuration, blowing agent from the source 182 is permitted to flow through the valve 190 and into the polymeric material in the extruder 102. Therefore, the injector valve 190 may be used to selectively control the introduction of blowing agent into the polymeric material in the system 100. In some embodiments, the blowing agent delivery system 180 includes both an injector valve 190 and bypass valve 192 to control blowing agent introduction. In these embodiments, the operation of the injector valve 190 may be coupled with the operation of the bypass valve 192, for example, using control system 184. In one embodiment, the injector valve 190 may be combined with the bypass valve 192 in a single device.

In operation the blowing agent delivery system 180 can, through the control system 184, control the introduction of blowing agent into the polymer processing space 110 of the extruder 102. Parameters of the blowing agent delivery that can be controlled include, but are not limited to, the injection rate, the amount of blowing agent being injected, the pressure at which the blowing agent is maintained during injection, the time at which blowing agent is injected, and the duration of an injection.

The blowing agent is typically introduced into the polymeric material so as to provide the mixture with a desired blowing agent level. The desired blowing agent level depends upon the particular process and is generally less than about 15% by weight of polymeric material and blowing agent. In many embodiments, the blowing agent level is less than about 3% and, in some embodiments, less than about 1%. In one example embodiment, the blowing agent level is between 0.1% and 2%, or between 0.3% and 0.9%, or more particularly between 0.4% and 0.75%. In an alternative embodiment, the blowing agent level may be less than about 0.1%, or even lower, by weight of polymeric material and blowing agent mixture.

The blowing agent may include, or consist essentially of, any appropriate type of physical blowing agent known to those of ordinary skill in the art such as, but not limited to, nitrogen, carbon dioxide, hydrocarbons (e.g., propane), chlorofluorocarbons, noble gases and/or mixtures thereof. In one example embodiment, the blowing agent comprises, or consists essentially of, nitrogen. The blowing agent may be supplied in any flowable physical state such as a gas, a liquid, or a supercritical fluid. According to one embodiment, a blowing agent source provides a blowing agent (e.g., nitrogen) that is in a supercritical fluid state upon injection into the extruder.

The blowing agent delivery system 180 may include a control and/or metering system to introduce blowing agent into polymeric material within the extruder 102 under specific conditions (such as, but not limited to, a specific injection rate of the blowing agent or a mass of blowing agent to be injected), as required by the particular process. For example, in one embodiment, such as for the formation of a foamed part using TPU as the polymeric material, the blowing agent mass flow rate may be between 0.001 lbs/hr and about 100 lbs/hr, in some cases between about 0.002 lbs/hr and 60 lbs/hr, and in some cases between about 0.02 lbs/hr and about 10 lbs/hr. Higher or lower flow rates may also be utilized, as appropriate.

The screw 104 can include elements such as, but not limited to, a restriction element 122 positioned upstream of the blowing agent port 120, a wiping section 124 at or closely downstream of the blowing agent port 120, and/or a mixing section 126 downstream of the blowing agent port 120.

A restriction element 122 may be positioned upstream of blowing agent port 120 when the screw 104 is mounted within the barrel 106 to restrict the upstream flow of polymeric material and blowing agent mixture in polymer processing space 110 while the accumulated mixture is injected into the mold 150. The restriction element 122 can therefore be used to maintain the pressure of the mixture in the polymer processing space 110 to prevent the blowing agent from prematurely coming out of solution. In various embodiments, the restriction element 122 may maintain the polymeric material downstream of the restriction element 122 at a pressure of at least 1000 psi throughout the injection cycle; in other cases, at least about 2000 psi; or, at least about 3000 psi throughout the injection cycle.

In one embodiment, the restriction element 122 is a valve which permits downstream flow of polymeric material therethrough in an open configuration and restricts upstream flow of polymeric material therethrough in a closed configuration. The valve may, for example, move from the closed configuration to the open configuration when the pressure of polymeric material downstream of the valve exceeds the pressure of polymeric material upstream of the valve. Suitable restriction element designs are described in U.S. Pat. No. 6,322,347, the disclosure of which is incorporated herein by reference in its entirety.

The wiping section 124 may be positioned downstream of the restriction element 122 and upstream of the mixing section 126 and, for example, substantially at the port 120 when the screw 104 is mounted in the barrel 106. The wiping section 124 may, for example, include an unbroken screw flight which passes beneath the blowing agent port 120 (including orifices, if present) to enhance dispersion of blowing agent when introduced into the polymeric material. In one embodiment, the wiping section 124 has a length of between about one-half and about three times the diameter of the screw 104. In an alternative embodiment, the length of the wiping section 124 may be shorter or longer as necessary.

A mixing section 126 can be positioned downstream of the restriction element 122 and, typically, downstream of port 120 when the screw 104 is mounted in the barrel 106. The mixing section 126 enhances the mixing of the blowing agent and polymeric material; the mixing could be distributive or dispersive or any combination of the two. The enhanced mixing enables formation of a single-phase solution of polymeric material and blowing agent which may be desirable for microcellular processing. In one embodiment, the mixing section 126 includes broken screw flights 128. However, it should be understood that the mixing section 126 may also be of other known designs such as, but not limited to, Maddock, pineapple, pin, gear, and kneading mixers (and/or combinations thereof). The length of the mixing section 126 may be or any appropriate length, depending upon the specific system. In one embodiment, for example, the mixing section 126 may have a length of between about two and about six times the screw diameter, although longer and shorter mixing section lengths are contemplated.

In one embodiment, the screw 104 includes a tip valve 130 positioned at a downstream end of the screw 104. The tip valve 130 may be opened during mixing to permit the accumulation of the polymeric material and blowing agent mixture in the distal portion 132 of the polymer processing space 110, and may be closed during injection to prevent the upstream flow of the accumulated mixture. The tip valve 130 thus maintains the pressure of the mixture in the distal portion 132 to prevent blowing agent from prematurely coming out of solution. The tip valve 130 can include, or consist essentially of, any appropriate valve design such as, but not limited to, a sliding piston design and/or a sliding ring check design. The tip valve 130 may be closed by pressure, spring action, or other mechanical means and may have one or multiple stage closing action. The tip valve 130 may also include mixing and pumping capabilities to help develop the single phase solution of blowing agent and molten polymer. In various embodiments, the tip valve may be designed to balance the closing speed to coordinate with the closing speed of the center pressure restriction element 122.

In one embodiment, the system 100 includes a shut-off nozzle valve 134 located between an outlet nozzle 136 of the extruder 102 and the attached mold 150. One or more heating units 140 may be positioned at the outlet nozzle 136 to control the temperature of the mixture from the extruder 102. The heating unit(s) 140 may be used to heat the outlet nozzle 136 to an elevated nozzle temperature prior to mixing, and hold the outlet nozzle 136 at that elevated temperature during mixing and injection. In one embodiment the heating unit(s) 140 can hold the outlet nozzle 136 at an elevated nozzle temperature that is higher than the elevated barrel temperature. In an example embodiment, such as for the formation of a foamed part using TPU as the polymeric material, the elevated nozzle temperature may be about 420° F.

In operation, the screw 104 is rotated by a screw driving element 138 (e.g., an electric motor) to plasticate polymeric material and to convey the polymeric material into a distal portion 132 within the barrel 106 downstream of the screw 104. Blowing agent is introduced into the polymer processing space 110 to mix with the polymeric material in a controlled manner as the material is being conveyed downstream along the length of the screw 104 towards the distal portion 132, thus forming a mixture of polymeric material and blowing agent in the polymer processing space 110. The mixture is mixed in mixing section 126 of the screw 104 to form a homogeneous mixture which accumulates in the distal portion 132 downstream of the screw 104. In one embodiment, the resulting mixture is a single-phase solution in which the blowing agent is dissolved in the polymeric material. Accumulation of the mixture in the distal portion 132 creates a pressure that may, in one embodiment, force the screw 104 axially in an upstream direction of the barrel 106. In an alternative embodiment the screw 104 is not axially moved during the process.

During accumulation, the shut-off nozzle valve 134 may be closed to maintain pressure within the accumulated charge sufficiently high to prevent premature nucleation, foaming or gas dissolution. After a sufficient charge of the mixture has been accumulated, the screw 104 may cease to rotate. Then, the shut-off nozzle valve 134, or any other appropriate flow control element, is opened to inject the mixture of polymeric material and blowing agent into one or more mold cavities 152 of a mold 150. The restriction element 122 and/or tip valve 130 may limit or substantially prevent back flow (i.e., flow in an upstream direction) of the accumulated mixture during injection to maintain the pressure and prevent premature nucleation, foaming or gas dissolution of the material. Furthermore, the restriction element 122 may reduce or prevent blowing agent from passing upstream of the blowing agent port 120 and out the delivery portal 114. In one embodiment, the shut-off valve 134, and/or another separate valve located within or at the exit of the outlet nozzle 136, may be used to control the injection of material into the mold cavity 152 by, for example, controlling at least one of a volume of the mixture being injected into the mold cavity 152 and/or a rate at which mixture is injected into the mold cavity 152, in one example embodiment, the volume of mixture injected into the mold cavity is between about 95% to 105% of the volume of the mold cavity prior to expansion.

Figure 2:
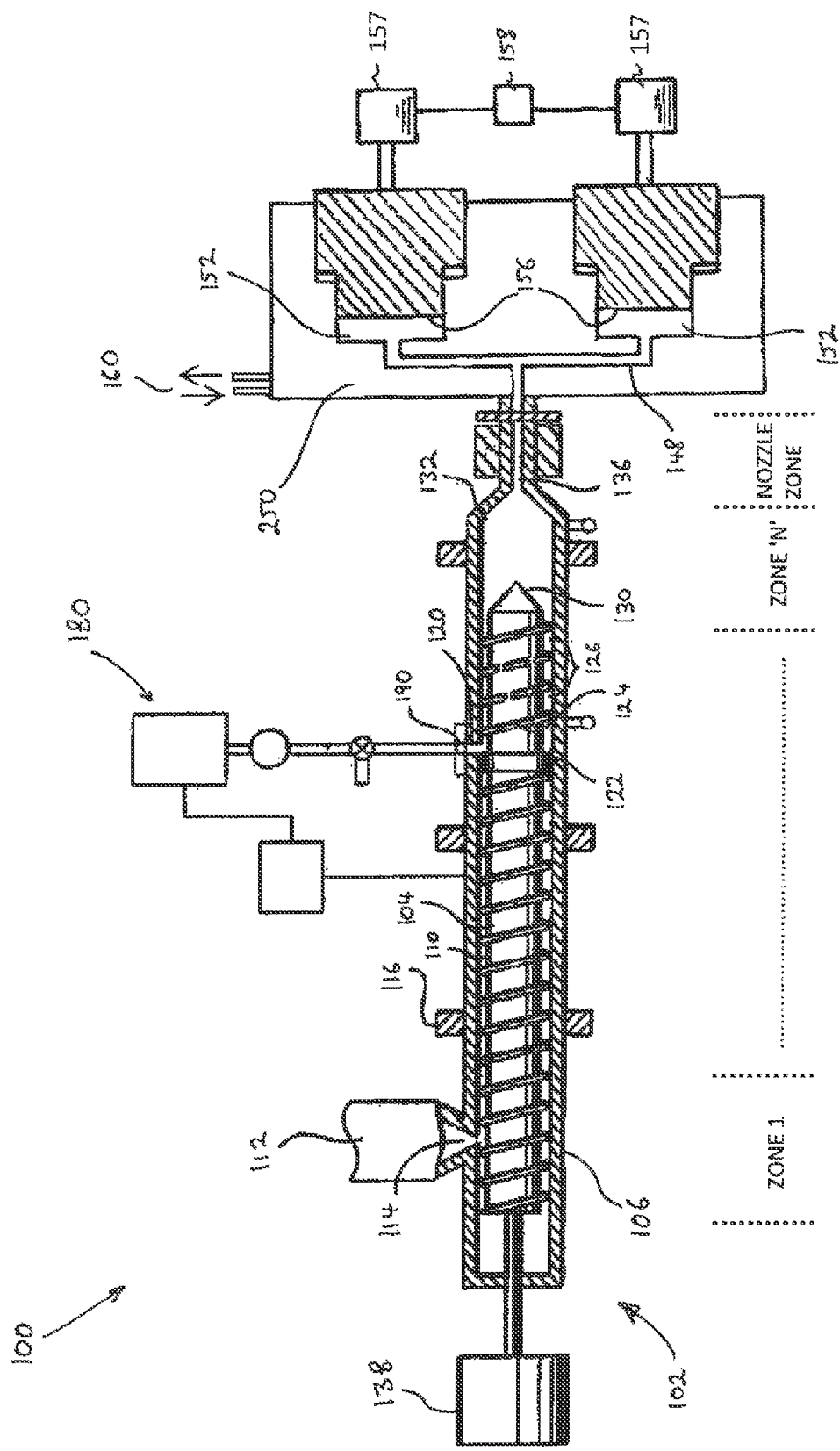
FIG. 2 is a schematic side view of an injection molding system for simultaneously injecting material into a plurality of expandable mold cavities, in accordance with one embodiment of the invention.
Figure 5:
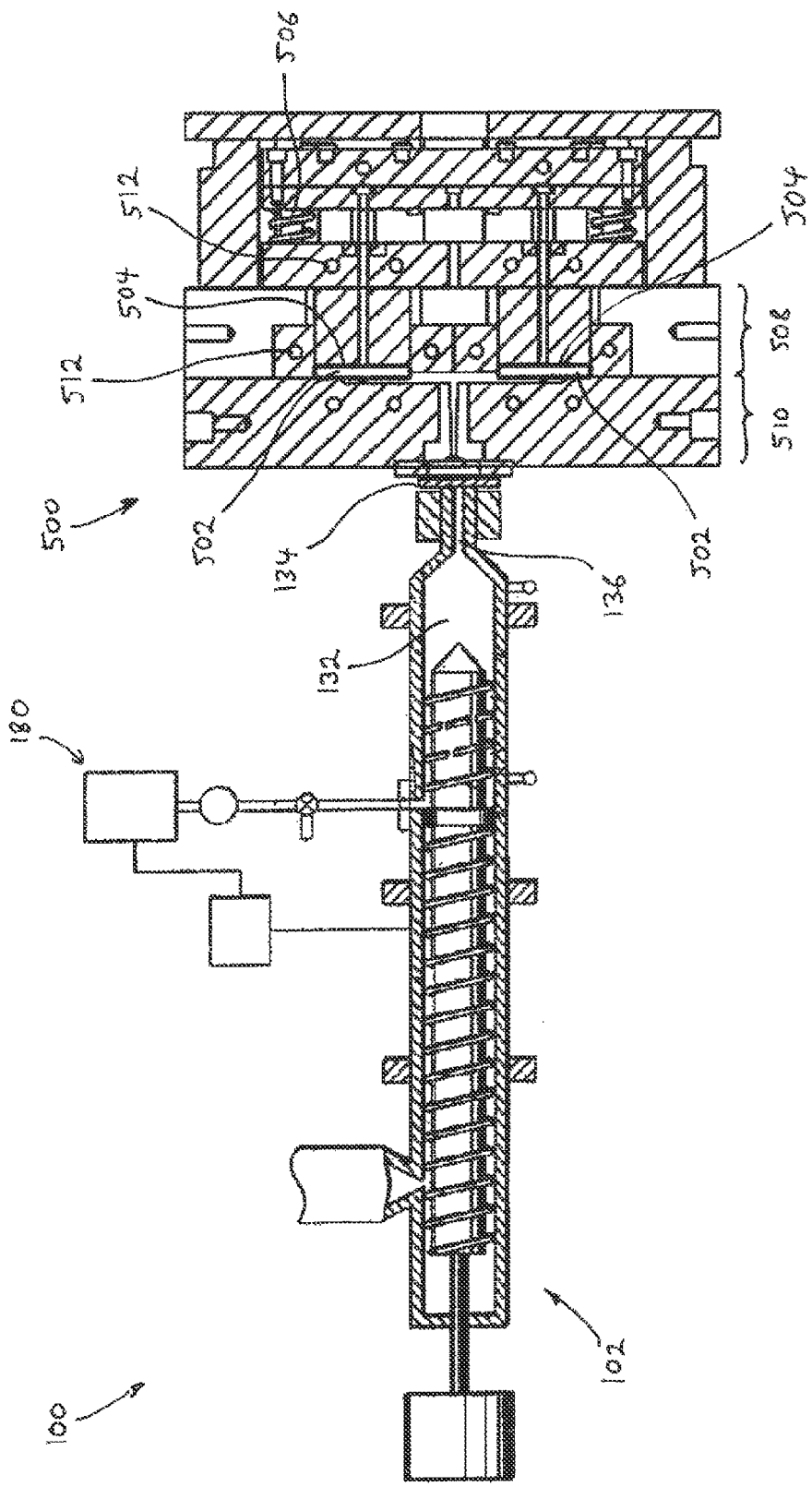
FIG. 5 is a schematic side view of an injection molding system and mold cavity for forming a plurality of footwear midsole components, in accordance with one embodiment of the invention.

Upon exiting from the outlet nozzle 136 of the extruder 102, the mixture of polymeric material and blowing agent is driven through one or more fluid transport channels 148 into one or more mold cavities 152 positioned within the mold 150. In one embodiment the mold 150 includes a single mold cavity 152, as shown in FIG. 1. In an alternative embodiment a mold 250 may have a plurality of mold cavities 152 that are filled simultaneously by the injected mixture, as shown in FIGS. 2 and 5. In a further alternative embodiment, the mold 150 comprises a plurality of mold cavities 152 that are filled in series by the injected mixture. For example, the mold 150 may be rotatable about a central axis to allow one or more mold cavities 152 to be exposed to the extruder 102 for injection of the polymeric material and blowing agent while one or more other mold cavities 152 are rotated away from the extruder 102 for unloading of a finished foamed part, preparation for receiving an additional material shot, removal and replacement of an insert defining a specific cavity shape, and/or maintenance.

Due to the pressure difference in the mixture, upon injection into the mold cavities 152 blowing agent dissolved in the polymeric material comes out of solution to nucleate a plurality of microcell sites. The nucleated sites grow into microcells and the article is cooled within the mold 150. The mold 150 may then be opened to produce the required microcellular foam article. The cycle may be repeated to form additional molded microcellular articles. To control the timing of cell nucleation or cell growth, either mechanical or gas counterpressure in the mold can be used in some embodiments, if desired. In various embodiments, the system 100 can be configured to control the amount of foaming of the mixture during and after injection of the mixture into the mold 150 but prior to expansion of the mold 150. For example, prior to expansion of the mold 150 the material injected into the mold 150 (e.g., a mixture including TPU and nitrogen) may have a density reduction, as compared to the solid material prior to injection, of less than about 10% and, for example, less than 7%, less than 5%, less than 3%, or even substantially 0%. In alternative embodiments larger density reductions prior to expansion (e.g., from 10-20%, or more) may be utilized.

In one embodiment the mold 150 includes a temperature control system for controlling the temperature within the mold 150 by, for example, heating the mold cavity 152 to an elevated temperature prior to injection of material, holding the mold cavity 152 at the elevated mold temperature during injection, and/or cooling the temperature of the mold cavity 152 during and/or after injection. The mold cavity may be held at an elevated temperature (with respect to the surrounding atmosphere) that is lower than the injection temperature of the mixture exiting the outlet nozzle 136 of the extruder 102. In one embodiment, such as for the formation of a foamed part using TPU as the polymeric material, the mold cavity is held at an elevated mold temperature of between about 70° F. and 130° F. during injection. The mold may be manufactured, for example, from aluminum.

In one embodiment the mold 150 includes one or more expansion elements 154 adapted to move one or more walls 156 of the mold cavity 152 to increase the volume of the mold cavity 152 during the injection process. This may be beneficial, for example, in controlling the expansion of the foaming material within the mold cavity 152 to produce a resultant foamed part having the desired properties (such as, but not limited to, mass, cell number, cell diameter, skin thickness, and/or density). In one embodiment, such as for the formation of a foamed part using TPU as the polymeric material, the volume of the mold cavity 152 after expansion may be about 2-4 times the volume of the mold cavity 152 prior to expansion and, more particularly, in one embodiment the volume of the mold cavity 152 after expansion is about 3 times the volume of the mold cavity 152 prior to expansion. In various alternative embodiments the volume of the mold cavity 152 after expansion may be of any appropriate size such as, but not limited to, up to between about 2 to 12 times the volume of the mold cavity 152 prior to expansion. For example, a foamed part may be formed by injecting a mixture of polymeric material and blowing agent into a mold cavity 152 having a thickness of about 2 mm, with the mold cavity 152 expanding during foaming until the mold cavity 152 has a thickness of about 6 mm after expansion. In an alternative embodiment, the mold cavity 152 may have any appropriate thickness of between about 0.5 mm to about 10 mm prior to expansion, and a thickness of between about 2 mm to 20 mm, or greater, after expansion. In various embodiments, depending upon the particular part being manufactured and the particular materials being utilized, the mold cavity 152 may expand by any appropriate volume ratio during processing up to, and even greater than an expansion ratio of ten.

The mold cavity 152 may be of any appropriate shape and size. In one embodiment, a mold 150 having a plurality of mold cavities 152 may be used to make a plurality of identical foamed parts, or a plurality of differently shaped foamed parts. In one embodiment, the mold cavities 152 are sized and shaped to form foamed parts for insertion as inserts in shoe midsoles. In an alternative embodiment, the mold cavities 152 are sized and shaped to form complete, or substantially complete, foamed midsoles.

The expansion elements 154 (e.g., a slideable plate defining one wall of the mold cavity 152) may be attached to one or more drive systems 157 adapted to move the expansion elements 154. In various embodiments the expansion elements 154 may be moved by any appropriate driving element such as, but not limited to, an electromagnetic motor, a pneumatic driving element, a hydraulic driving element, and/or a magnetic driving element. The mold 150 may include one or more temperature control systems 160 for controlling the temperature of the mold cavity 152 prior to, during, and after injection of the mixture. The temperature control system 160 may include any appropriate fluidic and/or electromagnetic temperature control element capable of raising the mold 150 to a set temperature and holding the mold 150 at or substantially at, that temperature during injection molding. An example temperature control system 160 includes a plurality of fluidic channels through which a temperature controlled thermally conductive fluid is driven.

Operation of the mold 150 may be controlled by a mold control system 158 which may control operative features of the mold 150 such as, but not limited to, the expansion rate of the mold cavity 152, the start and stop times for expansion, the volume by which the mold cavity 152 expands, and the temperature of the mold. The mold control system 158 may also, in one embodiment, control the opening and closing of the mold to facilitate recovery of the finished foamed part. In one embodiment, the mold control system 158 can also control the functionality of the mold temperature control system 160.

In one embodiment, the mold cavity 152 may be held in an unexpanded position for a set length of time during and/or after injection of the polymeric material and blowing agent mixture before expanding the mold cavity 152 to its expanded position. For example, the mold cavity 152 may, in one embodiment, be held in an unexpanded position for between about 1 to 30 seconds or 1 to 20 seconds or, in one embodiment where the polymeric material is TPU, 5 to 15 seconds and, for example, 10 seconds, after injecting the material mixture before beginning expansion. The mold cavity 152 may thereafter be held in its expanded position for a second time period (e.g., between about 1 to 60 seconds, or 10 to 60 seconds, or more particularly 35 to 40 seconds) after expansion and before releasing the mold to retrieve the finished part. In an alternative embodiment, the second time period may be up to about 120 seconds, or more.

In one embodiment, the expansion rate of the expandable mold cavity 152 may also be controlled. For example, in one embodiment the mold cavity may expand from its unexpanded position to its expanded position over about 1-5 seconds and, for example, about 1 second. In one embodiment the mold may expand at a faster rate than the free expansion rate of the foaming mixture. In an alternative embodiment the mold may expand at a slower rate, or substantially the same rate, as the free expansion rate of the foaming mixture.

Figure 3:
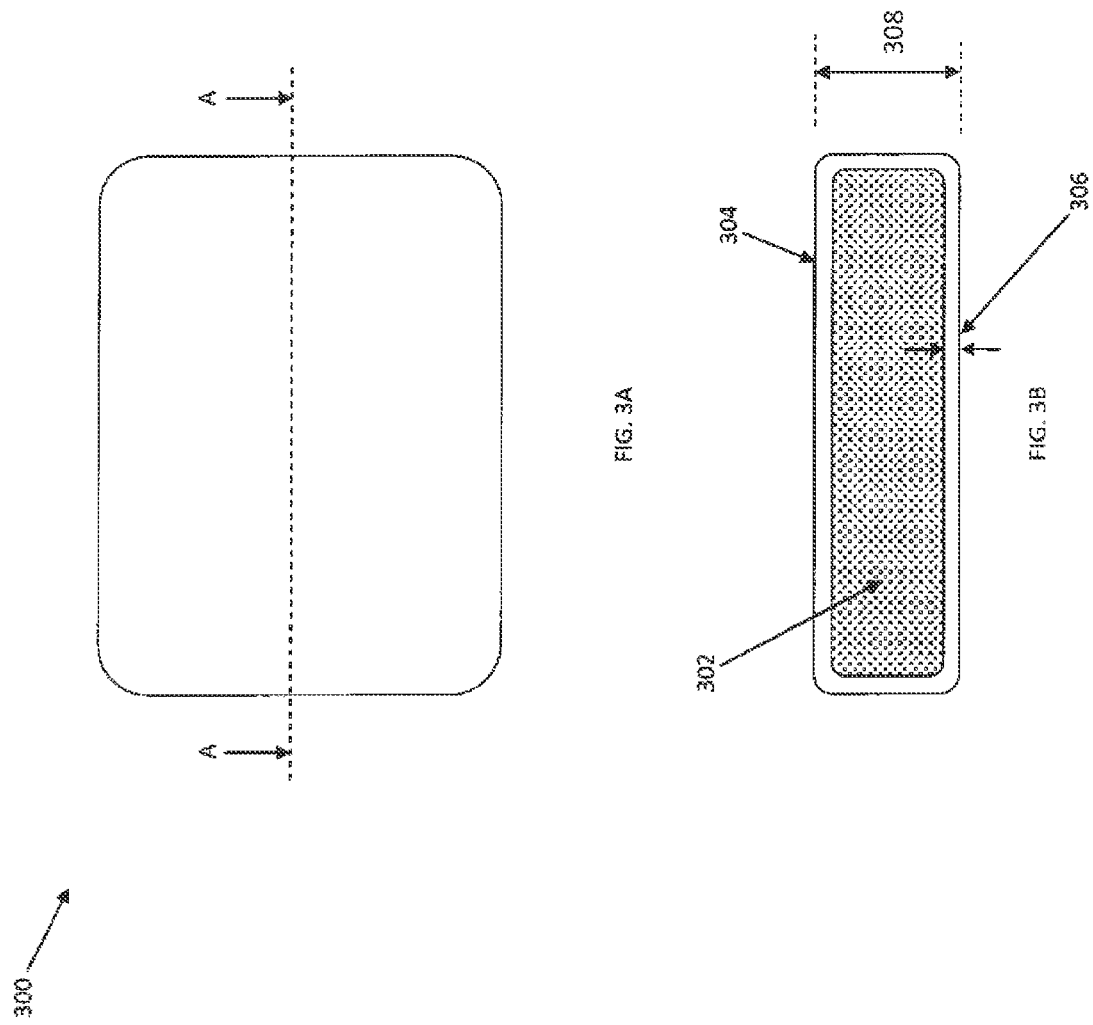
FIG. 3A is a schematic plan view of an example foamed part, in accordance with one embodiment of the invention.
FIG. 3B is a cross-sectional side view of the foamed part of FIG. 3A through section A-A.

The resulting foamed part created by the methods and systems described herein includes an outer skin layer surrounding a foamed core. An example foamed part 300 is shown in FIGS. 3A and 3B. The foamed part 300 includes a foamed inner portion 302 surrounded by an outer skin layer 304. The particular thickness and properties of the skin layer are controlled by the properties of the material being injected and the conditions within the mold during injection. In one embodiment, the control parameters may be selected to produce a foamed part having a skin layer with a skin thickness 306 of between about 100 μm and 500 μm and, in one particular example embodiment, such as for the formation of a foamed part using TPU as the polymeric material, about 300 μm. Other parameters of the resulting foamed parts that may be controlled by the system and methods described herein include, but are not limited to, melt temperature, density, mass, average cell number and/or average cell diameter. For example, the average cell diameter of an example foamed part may be between about 0.01 μm and 50 μm, and the average cell number of an example foamed part may be between about $10^8$ and $10^{16}$ cells/cm$^3$. The resulting thickness 308 of the foamed part is dependent upon the expanded thickness of the mold cavity 152. In certain embodiments, the estimated melt temperature of the resulting foamed part is substantially the same as, or substantially similar to, the melt temperature of the polymeric material. In one embodiment, foamed parts having an estimated melt temperature within 5° C. of the melt temperature of the polymeric material may be formed.

In one embodiment, the estimated melting temperature of the resulting foamed part was unaffected, or minimally effected, by the foaming processes described herein. For example, in one embodiment, where the polymeric material consisted essentially of TPU, the estimated melting temperature of the foamed parts was within 5° C. of the melting temperature of the unprocessed polymeric material.

In one embodiment, a single control system can control multiple functions of the system 100 including, but not limited to, the operation of various elements of the extruding system 102 and/or mold. For example, a single control system may be used to control all functionality of the extruding system 102 necessary to deliver a required mixture of polymeric material and blowing agent into a mold by, for example, controlling operation of elements including, but not limited to, the polymeric material deliver system 112, the blowing agent delivery system 180, the barrel heating unit(s) 116, the screw driving element 138, the nozzle heating units 140, and/or the shut-off nozzle valve 134 (and/or other valve elements necessary to control flow of material through the outlet nozzle 136). The control system could also control the functionality of the mold 150 by, for example, controlling operation of elements including, but not limited to, the mold control system 158 and/or mold temperature control system 160. In an alternative embodiment multiple control systems can communicate to control the molding process or operate independently to control certain portions of the molding process.

The foamed part created by the methods and systems described herein may be advantageously utilized, for example, within shoe soles and, more particularly, as midsoles or component parts of a midsole. More particularly, forming shoe midsoles, or insertable components of a shoe insole (e.g., an insert for positioning within a central portion of a shoe insole at a heel and/or forefoot portion thereof) using the methods and systems described herein may produce shoes having substantially improved performance characteristics from midsoles formed using prior art methods. For example, the foamed parts created by the methods and systems described herein can be used to form shoe soles having beneficial compliance characteristics (e.g., mechanical impact scores) for athletic shoes (e.g., running shoes while still maintaining sufficient durability (e.g., compression set to ensure long term use and stability. In addition, such foamed parts may be used to produce midsoles having desirable cushioning characteristics for an athletic shoe for a lower profile midsole component (i.e., thinner midsole) than may be achieved through prior art methods.

The methods described herein may also be utilized to more quickly and efficiently produce foamed parts for use in shoe soles than can be achieved in traditional foaming methods, with the process potentially producing superior quality parts for a lower cost than traditional foaming methods can produce. In addition, by utilizing materials such as, but not limited to, TPU (which can be remelted and reused), the methods and systems described herein may be used to produce recyclable shoe soles or shoe sole components.

Figure 4:
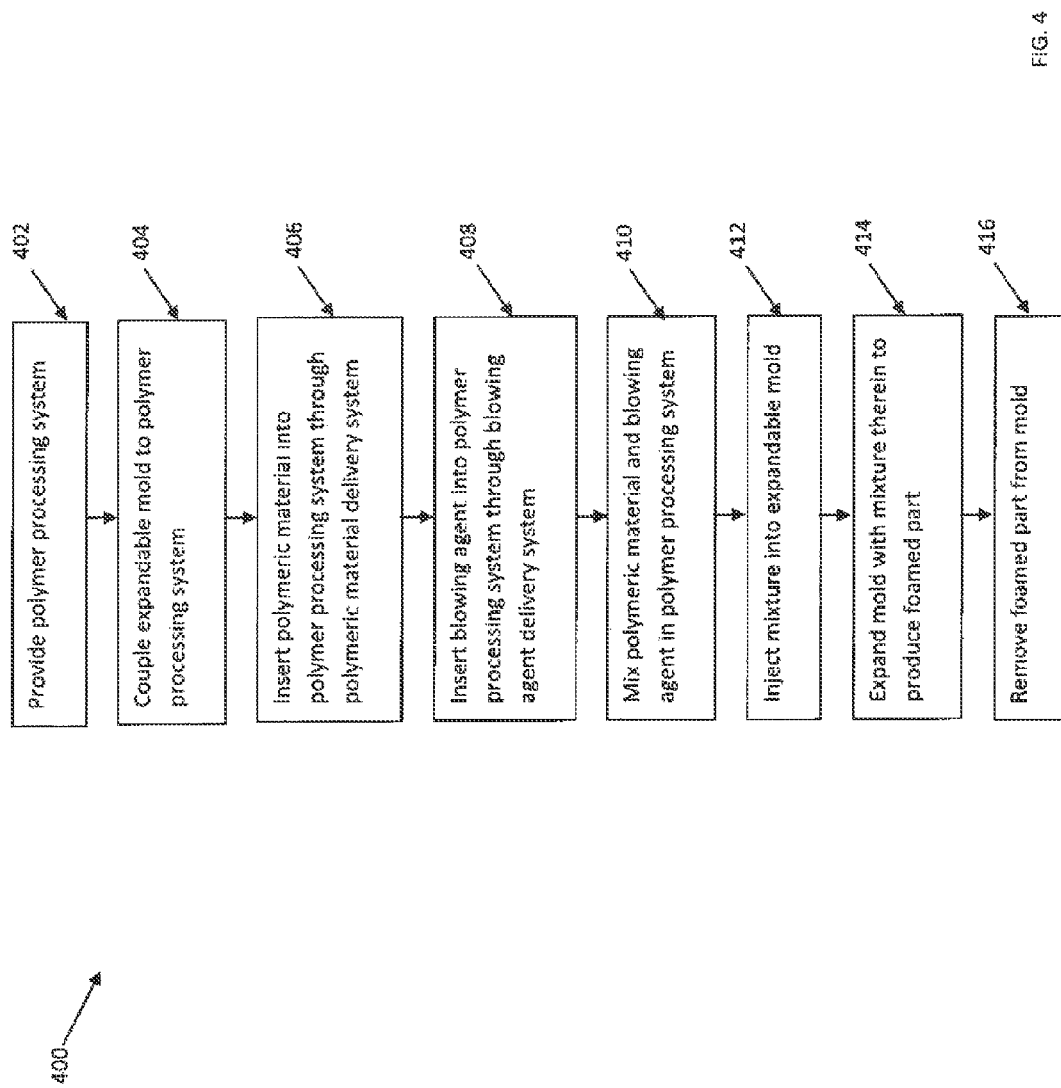
FIG. 4 is a flow chart of an example method for forming a foamed part, in accordance with one embodiment of the invention.

An example method of producing a foamed part is shown in FIG. 4. The method includes providing a polymer processing system 402 coupled to an expandable mold 404. The polymer processing system including: (i) a screw mounted within a barrel to define a polymer processing space within the barrel; (ii) a polymeric material delivery system in communication with the polymer processing space; (iii) a blowing agent delivery system in communication with the polymer processing space; and (iv) at least one nozzle in fluid communication with a distal portion of the polymer processing space. Polymeric material is inserted 406 into the polymer processing system through a polymeric material delivery system, and blowing agent is inserted 408 into the polymer processing system through a blowing agent delivery system. The polymeric material and blowing agent are then mixed 410 within the polymer processing space to produce an unfoamed mixture, which is then injected 412 through the nozzle and into the expandable mold cavity. The mold cavity is then expanded 414 to form the foamed part, which can then be removed 416 from the mold.

An example mold 500 for forming a component of a shoe midsole is shown in FIG. 5. The mold 500 comprises a plurality of expandable mold cavities 502. The mold 500 may include a plurality of cooling lines 512 to allow cooling fluid to be driven through the mold 500 to control the temperature of the mold during operation.

In one embodiment the mold cavities 502 may be expanded by the lateral displacement of a first wall 504 of each mold cavity 502 through, for example, a core-back method. The movable wall 504 of each cavity 502 may be powered by hydraulically powered floor motion mechanics driving a wall control element 506. In various alternate embodiments each mold cavity 502 may be driven by the same or separate wall control elements 506 and/or the wall control elements 506 may be driven by any appropriate powered floor motion mechanics including, but not limited to, pneumatic, electromagnetic, mechanical, and/or magnetic systems.

In another embodiment the mold cavities 502 may be expanded by the lateral displacement of a second mold section 508 from a first mold section 510. In this embodiment, the movement of the second mold section 508 from the first mold section 510 will open the mold cavities 502 to the surrounding environment during foaming. However, due to the rapid rate of expansion of the foaming mixture within the mold cavities 502, e.g., in the direction of the fixed first mold section 510, this results in only minimal expansion of the resulting foaming part beyond the edges of the mold cavity 502. When a core-back expansion method is used the mold cavities 502 are not exposed to the atmosphere until after molding is completed and, as a result, the resulting foamed part is formed with the exact, or substantially exact, dimensions of the mold cavities 502 after expansion.

Figure 10A:
FIG. 10A is a side view of a hexagonal mold cavity shape for forming a foamed part, in accordance with one embodiment of the invention.
Figure 10B:
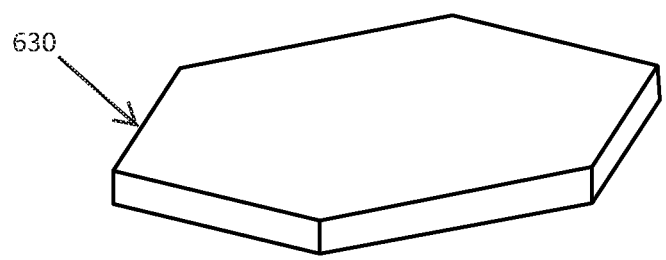
FIG. 10B is a perspective view of the hexagonal mold cavity shape of FIG. 10A.
Figure 10C:
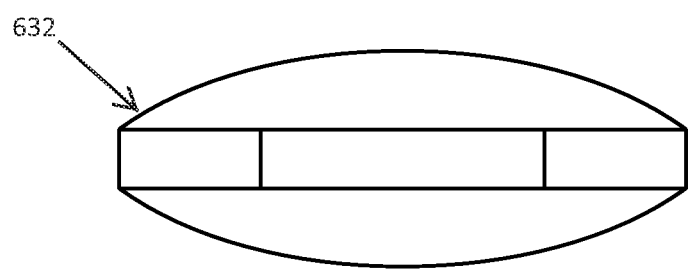
FIG. 10C is a side view of a foamed part formed using the hexagonal mold cavity shape of FIG. 10A.
Figure 10D:
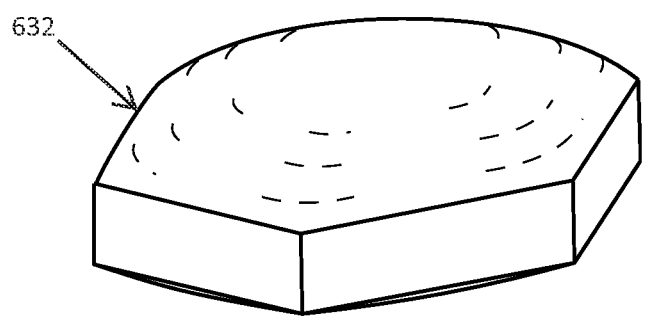
FIG. 10D is a perspective view of the foamed part of FIG. 10C.

In one embodiment, foamed parts may be formed by utilizing a crack-molding process whereby the second mold section 508 opens the mold cavities 502 to the surrounding environment at a sufficient speed and/or by a sufficient displacement to allow the material in the mold to expand without constraint in the direction away from the fixed first mold section 510. This process allows for a more unrestrained expansion of the foamed part during the foaming process, thereby allowing for the creation of more complex, three-dimensional, foamed parts. An example structure formed using this crack-molding process is shown in FIGS. 10A to 10D, with FIGS. 10A and 10B showing a hexagonal mold cavity shape 630 prior to mold expansion, and FIGS. 10C and 10D showing a foamed part 632 formed through the crack-molding process after expansion of the hexagonal mold cavity shape 630. In various embodiments, mold cavities of any size and shape may be utilized, depending upon the structural and material properties required of the resulting foamed part.

Figure 6A:
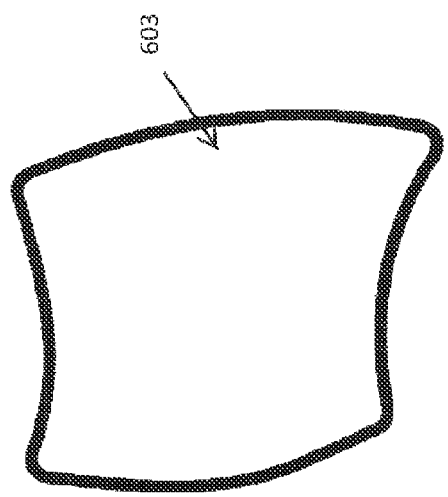
FIGS. 6A to 6D are schematic plan views of example foamed midsole components for an article of footwear, in accordance with one embodiment of the invention.
Figure 6B:
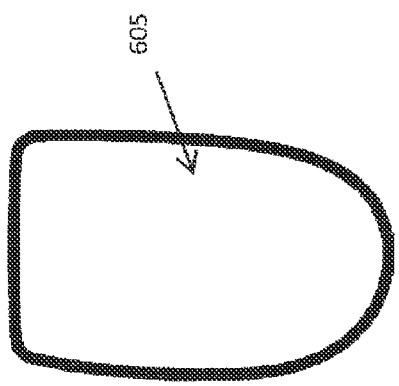
Figure 6C:
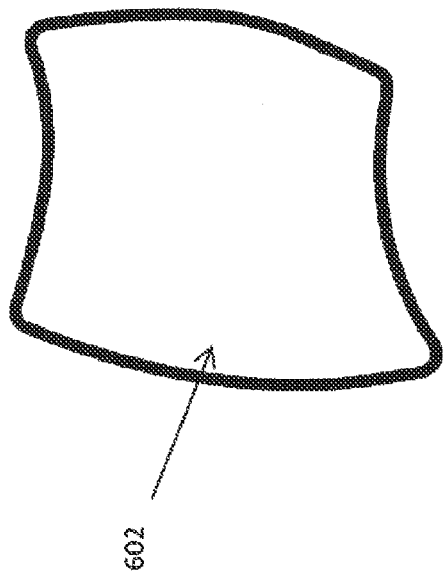
Figure 6D:
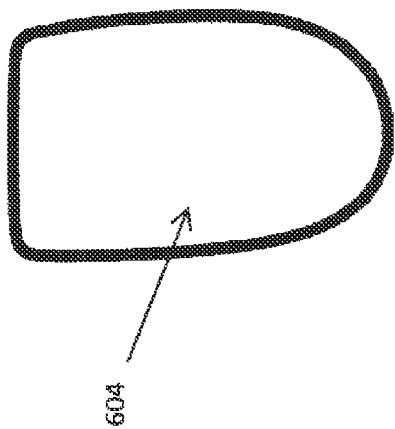
Figure 7A:
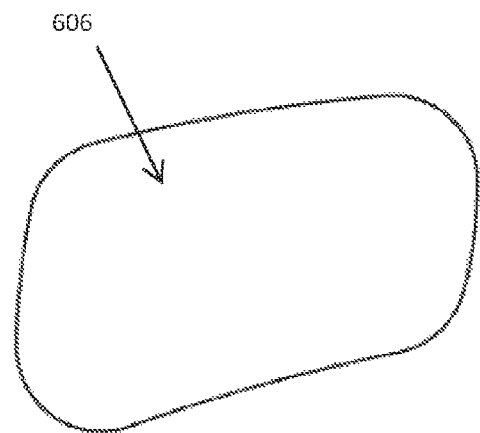
FIGS. 7A and 7B are schematic plan views of another pair of foamed forefoot midsole components for an article of footwear, in accordance with one embodiment of the invention.
Figure 7B:
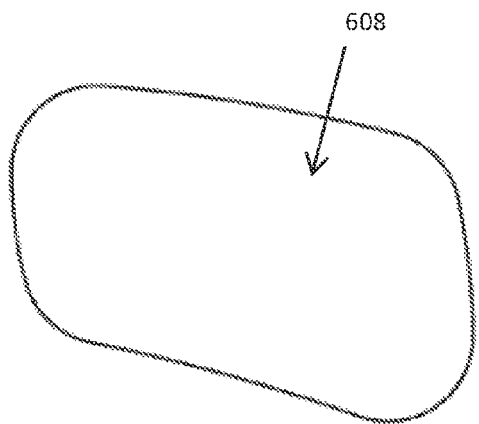

In one particular example embodiment, foamed parts were formed by using TPU as the polymeric material and nitrogen as the blowing agent. The parts were formed in a multi-cavity mold with expansion of the mold cavity performed by lateral displacement of a second mold section from a first mold section, as described above. The resulting foamed parts included forefoot inserts for a left foot 602 and a right foot 603, as shown in FIGS. 6A and 6B, and heel inserts for a left foot 604 and a right foot 605, as shown in FIGS. 6C and 6D, for insertion into midsoles of athletic footwear. In various embodiments, inserts of any appropriate size and shape may be formed, depending upon the specific design and functional characteristics required. An example foamed part forming an alternative forefoot insert for a left foot 606 and a right foot 608 of a shoe sole is shown in FIGS. 7A and 7B.

The method of forming the foamed parts included controlling an injection molding system in accordance with the following parameters:

TABLE 1

Control Parameters for Forming TPU Parts

| TPU Material | Pellethane ® 2355-75A | Utechllan ® U75A | Utechllan ® U80A | Utechllan ® U85A |
|---|---|---|---|---|
| Percentage volume of Blowing Agent in mixture (%) | 0.48 | 0.72 | 0.59 | 0.59 |
| Blowing Agent Injection Rate (in/s) | 4 | 2.5 | 1.1 | 3 |
| Zone A Temp (° F.) | 350 | 350 | 350 | 350 |
| Zone B Temp (° F.) | 370 | 370 | 370 | 370 |
| Zone C Temp (° F.) | 390 | 390 | 390 | 390 |
| Zone D Temp (° F.) | 420 | 420 | 420 | 420 |
| Zone E Temp (° F.) | 420 | 420 | 420 | 420 |
| Nozzle Temp (° F.) | 420 | 420 | 420 | 420 |
| Mold Temp (° F.) | 120 | 100 | 100 | 100 |

Performing the methods described herein in accordance with these parameters, foamed parts were formed with the following parameters:

TABLE 2

Foamed Material Parameters for TPU Parts

| TPU Material | Pellethane ® 2355-75A | | Utechllan ® U75A | Utechllan ® U80A | Utechllan ® U85A |
| | Forefoot | Heel | | | |
|---|---|---|---|---|---|
| Skin Thickness (mm) | 0.04 | 0.31 | 0.33 | 0.4 | 0.38 |
| Cell diameter (mm) | 0.99 | 0.16 | 0.1 | 0.09 | 0.07 |

The resulting forefoot inserts 602 and heel inserts 604 were created with structural properties that resulted in advantageous performance characteristics for athletic footwear.

In one embodiment, the lateral wall displacement may include an asymmetric displacement of a first wall 504 of one or more mold cavity 502 with respect to a second wall of the mold cavity 502. For example, the first wall 504, or a portion thereof, may be rotated around a pivot point as it is pulled back, thereby pulling away from the opposite wall of the mold cavity 502 by a greater amount at one side of the mold cavity 502 than the other. In one embodiment, any appropriate combination of linear travel and asymmetric travel may be utilized over the width of the first wall 504 to produce foamed parts having complex three-dimensional shapes, with a thickness of the foamed part varying along its length and/or width.

An example foamed part 610 having an asymmetric thickness, produced by an asymmetric displacement of one wall of a mold cavity during the foaming process, can be seen in FIGS. 8A-8C. In this example, the foamed part 610 may form a portion of a heel component of a shoe midsole. In this embodiment, the moving wall of the mold cavity pulls back and pivots during the foaming process, resulting in a foamed part 610 having a first thickness 612 on one side of the part 610 and a second, smaller, thickness 614 on the other side of the part 610. In various embodiments the wall may pivot or otherwise displace during the foaming process to produce parts of any appropriate three-dimensional profile. In various embodiments the mold cavity may include a plurality of pivotable wall portions, thereby allowing the foamed part to form a variety of complex three-dimensional shapes when foamed.

In one embodiment one or more wall of the mold cavity may include one or more membrane elements that inflate and/or deflate during the molding process to provide a complex three-dimensional surface on at least one side of the molded part. In this embodiment, the membrane may, for example, include structural elements that hold the membrane in a first shape when inflated. When the membrane is deflated, say during the molding process, the membrane may collapse to a second shape or collapse completely onto a solid backing surface, with the resulting molded part conforming in shape to the membrane second shape or the shape of the backing surface.

Figure 9A:
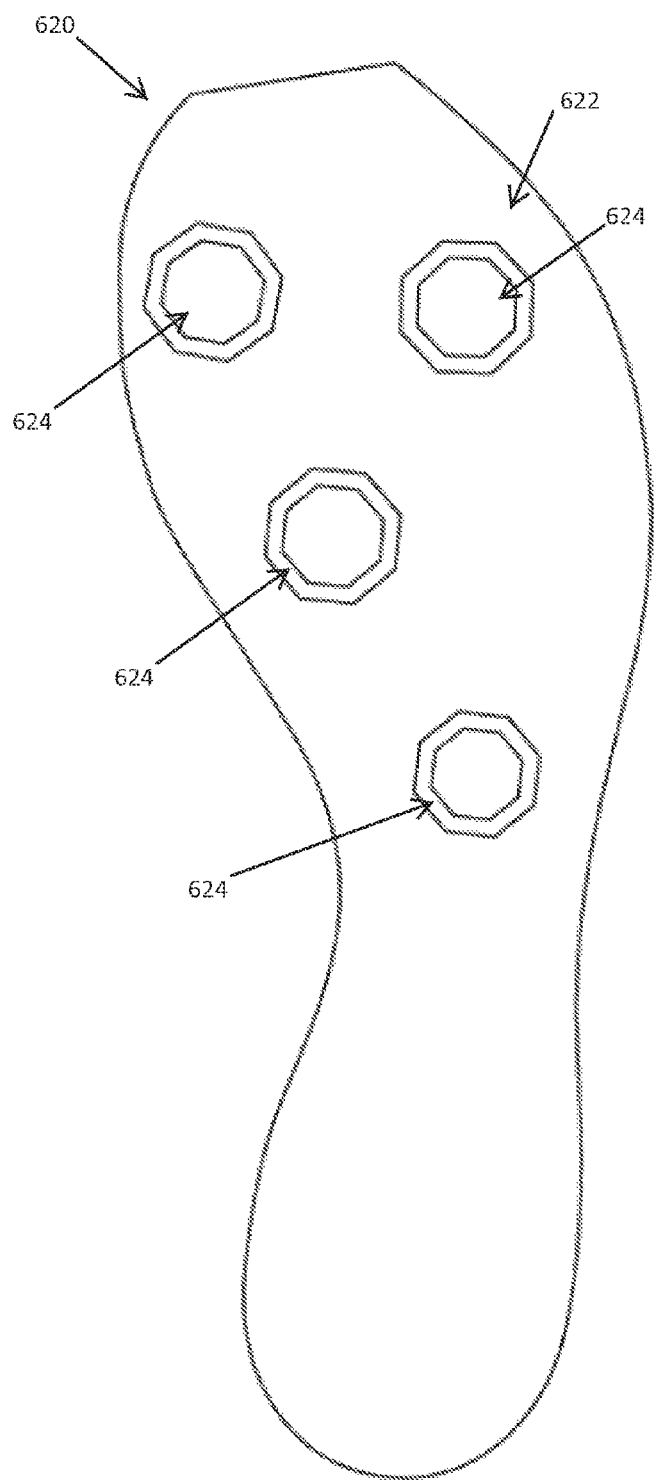
FIG. 9A is a schematic plan view of a full length foamed midsole for an article of footwear, in accordance with one embodiment of the invention.
Figure 9B:
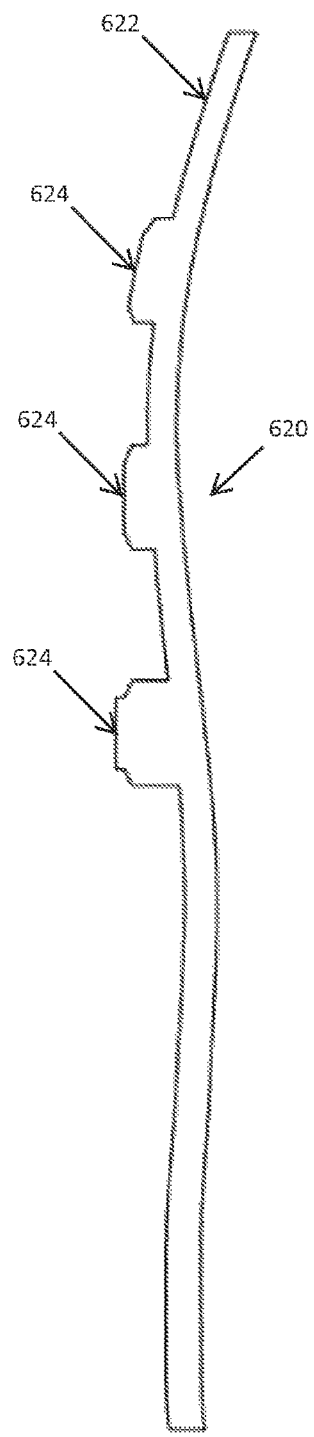
FIG. 9B is a side view of the midsole of FIG. 9A.

In one embodiment, the systems and methods described herein may be utilized to produce full length midsole components that may form part of, or the entire, midsole of a shoe sole. Such full length midsole components may be formed with simple, substantially planar, surfaces, or be formed with one or more complex, multi-faceted surfaces. An example full length midsole component 620 having a lower surface 622 having a plurality of shaped protrusions 624 extending therefrom can be seen in FIGS. 9A and 9B. In this embodiment, the protrusions 624 may be formed by using a mold cavity having a wall with shaped cavities therein, with the shaped cavities conforming to the shape of the protrusions 624.

In one embodiment, a far wall of one or more of the shaped cavities may be adapted to retract at a different speed and/or by a different amount to the remainder of the mold cavity wall, thereby allowing the material in the cavities to expand by a greater or lesser amount to that of the remaining material during foaming. As a result, protrusions 624 may be formed that have the same or different material properties (e.g., a greater, less, or the same density) to that of the remainder of the foamed component. In various alternative embodiments components or any size, shape, and/or complexity can be formed using one or more of the methods and systems described herein.

In one embodiment, one or more lugs or inserts may be placed into one or more mold cavities prior to the foaming process, thereby allowing the foamed material to expand around and/or into the inserts during the foamed process, thereby forming a finished foamed parts having the inserts embedded therein. This may, for example, allow for the formation of foamed parts having structural elements (e.g., stiffening or strengthening elements, threaded elements for receiving cleats or spikes, etc.) of one or more different material to be integrally embedded within the foamed part.

It should be understood that alternative embodiments, and/or materials used in the construction of embodiments, or alternative embodiments, are applicable to all other embodiments described herein.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method of forming a foamed part, the method comprising: providing a polymer processing system comprising:
    (i) a screw mounted within a barrel to define a polymer processing space within the barrel;
    (ii) a polymeric material delivery system in communication with the polymer processing space;
    (iii) a blowing agent delivery system in communication with the polymer processing space; and
    (iv) at least one nozzle in fluid communication with a distal portion of the polymer processing space;
    providing a mold having at least one expandable mold cavity in fluid communication with the nozzle;
    mixing polymeric material and blowing agent within the polymer processing space to produce an unfoamed mixture;
    injecting a volume of the mixture of polymeric material and blowing agent through the nozzle and into the expandable mold cavity; and
    expanding the mold cavity, after injecting the volume of the mixture of polymeric material into the mold cavity, to form the foamed part, wherein expanding the mold cavity comprises an asymmetric lateral displacement of a movable first wall portion of the mold cavity with respect to a stationary second wall portion of the mold cavity, while the volume of the mixture of polymeric material is expanding in the mold cavity, by rotation of the movable first wall portion with respect to the stationary second wall portion.

2. The method of claim 1, wherein the foamed part has an estimated melt temperature within 5° C. of the melt temperature of the unprocessed polymeric material.

3. The method of claim 1, wherein the polymeric material comprises at least one of thermoplastic polyurethane (TPU), ethylene vinyl acetate (EVA), polyethylene, or thermoplastic rubbers (TPRs).

4. The method of claim 1, wherein the blowing agent delivery system comprises a metering system that is adapted to control at least one of a flow rate of the blowing agent and a mass of blowing agent to be injected.

5. The method of claim 4, wherein the mass of blowing agent being injected into the polymeric processing space comprises between about 0.1% and about 2% by weight of unfoamed mixture.

6. The method of claim 1, wherein the barrel is heated to an elevated barrel temperature prior to mixing.

7. The method of claim 6, wherein the nozzle is heated to an elevated nozzle temperature prior to mixing and wherein the elevated nozzle temperature is higher than the barrel temperature.

8. The method of claim 1, further comprising controlling at least one of a volume of mixture being injected into the mold cavity and a rate at which mixture is injected into the mold cavity.

9. The method of claim 1, further comprising maintaining the expandable mold cavity at a first mold temperature prior to injection of polymeric material.

10. The method of claim 1, wherein the volume of the mold cavity after expansion is between about 2-12 times the volume of the mold cavity prior to expansion.

11. The method of claim 1, further comprising at least one of:
    (i) holding the mold cavity in an unexpanded position for a first time period prior to expansion;
    (ii) holding the mold cavity in an expanded position for a second time period after expansion; and
    (iii) controlling an expansion rate of the expandable mold cavity.

12. The method of claim 1, wherein expanding the mold cavity further comprises linear lateral displacement of the first wall portion with respect to the second wall portion.

13. The method of claim 1, wherein the foamed part comprises a skin layer.

14. The method of claim 13, wherein the skin layer has a skin thickness of between about 100 µm and about 500 µm.

15. The method of claim 13, wherein the polymeric material comprises TPU and the skin layer has a skin thickness of about 300 µm.

16. The method of claim 1, wherein the foamed part has an average cell diameter of between about 0.01 µm and about 200 µm.

17. The method of claim 16, wherein the polymeric material comprises TPU and the foamed part has an average cell diameter of between about 0.01 µm and about 50 µm.

18. The method of claim 1, wherein the foamed part has an average cell number of between about $10^8$ and about $10^{16}$ cells/cm$^3$.

19. A method of forming a foamed cushioning element adapted for insertion into a cavity within at least one of a heel portion and a forefoot portion of a midsole of a shoe sole, the method comprising:
    providing a polymer processing system comprising:
        (i) a screw mounted within a barrel to define a polymer processing space within the barrel;
        (ii) a polymeric material delivery system in communication with the polymer processing space;
        (iii) a blowing agent delivery system in communication with the polymer processing space; and
        (iv) at least one nozzle in fluid communication with a distal portion of the polymer processing space;
    providing a mold having at least one expandable mold cavity in fluid communication with the nozzle;
    mixing polymeric material and blowing agent within the polymer processing space to produce an unfoamed mixture;
    injecting a volume of the mixture of polymeric material and blowing agent through the nozzle and into the expandable mold cavity; and
    expanding the mold cavity, after injecting the volume of the mixture of polymeric material into the mold cavity, to form the foamed cushioning element by applying an external force to a first wall portion of the mold cavity to displace the first wall portion with respect to a second wall portion of the mold cavity, wherein applying an external force to the first wall portion comprises an asymmetric lateral displacement of the first wall portion with respect to a stationary second wall portion, while the volume of the mixture of polymeric material is expanding in the mold cavity.

20. The method of claim 19 further comprising controlling a temperature of the mold.

21. The method of claim 20, wherein controlling the temperature of the mold comprises passing a cooling fluid through the cooling lines in the mold.

22. The method of claim 20, wherein controlling the temperature of the mold also controls a temperature of the foamed cushioning element.

23. The method of claim 19, wherein displacement of the first wall portion of the mold cavity with respect to the second wall portion of the mold cavity comprises a coreback method.

24. The method of claim 19, wherein displacement of the first wall portion of the mold cavity with respect to the second wall portion of the mold cavity comprises being driven by a wall control element.

25. The method of claim 24, wherein the wall control element is selected from the group consisting of a pneumatic system, an electromagnetic system, a mechanical system, and a magnetic system.

* * * * *